March 28, 1939.  V. PARKINS  2,152,275
FISH LURE
Filed Nov. 6, 1937
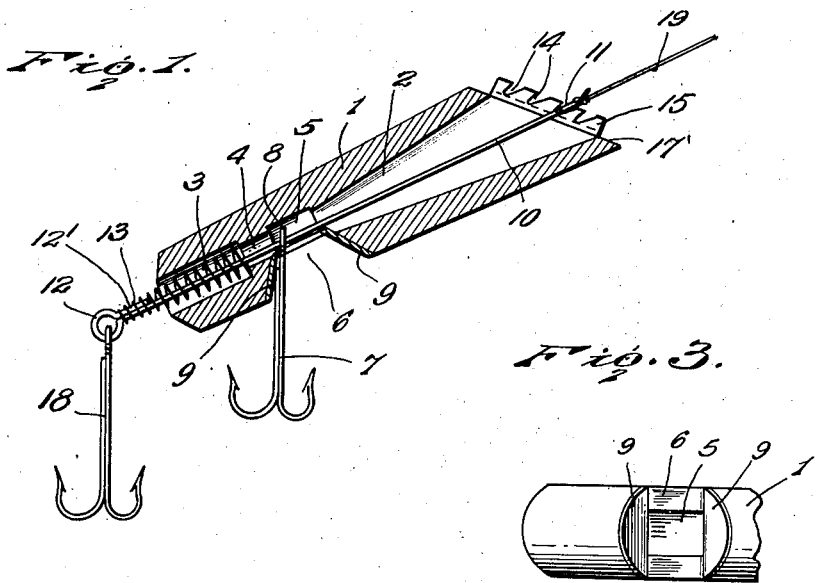
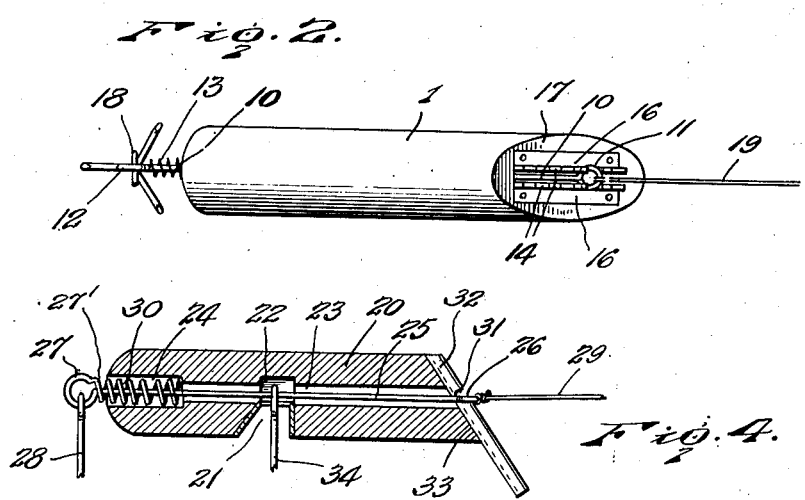
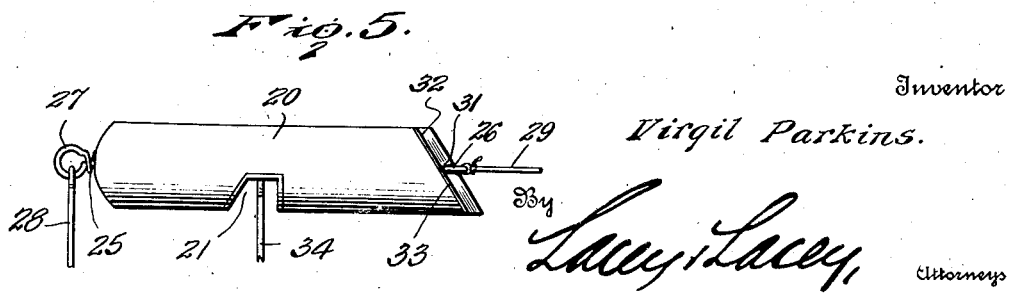
Inventor
Virgil Parkins.
By Lacey & Lacey,
Attorneys Patented Mar. 28, 1939

2,152,275

UNITED STATES PATENT OFFICE 2,152,275

FISH LURE

Virgil Parkins, Tiffin, Ohio

Application November 6, 1937, Serial No. 173,229

14 Claims. (Cl. 43—46)

This invention relates to an artificial bait or fish lure of the type used when trolling, and it is one object of the invention to provide a device of this character of such construction that as it is drawn through the water movements similar to those of a live minnow will be imparted to the device.

Another object of the invention is to so construct the artificial lure that the depth at which it will move below the surface of the water will be controlled and thus the lure caused to move through the water at the proper depth to be taken by fish of a species which it is desired to catch.

Another object of the invention is to provide the lure with a hook-carrying stem serving as means for loosely mounting a hook intermediate the length of the body portion of the lure as well as carrying a hook at its rear end. It will thus be seen that by removing the stem from the body portion of the lure a new hook may be applied when necessary or a larger or smaller hook applied in place of a hook already mounted.

Another object of the invention is to provide improved means for mounting the stem through the body portion of the lure.

The invention is illustrated in the accompanying drawing, wherein

Figure 1 is a sectional view taken longitudinally through an artificial lure of the improved construction, Figure 2 is a top plan view of the improved lure, Figure 3 is a bottom plan view of the rear portion of the artificial lure, Figure 4 is a sectional view taken longitudinally through an artificial lure of a modified construction, and Figure 5 is a side elevation of an artificial lure of a slightly different construction from that illustrated in Figure 4.

This artificial lure has a body 1 formed of wood or other desired material. A passage is formed longitudinally through the body, and upon referring to Figure 1, it will be seen that this passage has a forward portion or mouth 2 which is tapered rearwardly so that it is gradually reduced in depth from the front end of the body towards the rear end thereof. The rear end portion 3 of the passage constitutes a spring seat or pocket from which extends a reduced neck 4 connecting the pocket with a pocket or chamber 5, the forward end of which communicates with the rear end of the mouth 2 of the pocket. This chamber or pocket 5 is of greater diameter than the neck 4 and the rear end of the mouth 2 and has its under portion open and communicating with a notch or recess 6 formed in the under portion of the body 1 in spaced relation to the rear end thereof. This notch or recess 6 is provided in the under portion of the body to receive the shank of the hook 7 and permit the eye 8 of the hook to be disposed within the pocket 5. Plates 9 are secured against front and rear walls of the notch or recess 6 and serve to protect the surfaces as well as providing weight which will assist to maintain the hook in its proper position as it is drawn through the water.

In order to suspend the hook 7, there has been provided a stem 10 which extends longitudinally of the body through the passage formed therethrough, as shown in Figure 1. This stem is formed of wire and is provided with eyes 11 and 12 at its front and rear ends. This wire stem carries a coiled spring 13 about its rear portion which is seated in the pocket 3 with its forward end bearing against the front end of the pocket and its rear end bearing against the eye 12, and it should be noted that the spring which is of helical formation is gradually reduced in diameter towards its rear end and fits snugly about the bill 12' of the eye 12 to hold the eye closed. The eye 11 at the forward end of the stem is small enough to be passed through the eye 8 of the hook and extends transversely of the eye 12. It will thus be seen that, when the eye 11 is engaged in a companion set of notches 14 formed in the upstanding flanges 15 of plates 16 which are secured against the front end face 17 of the body 1, the eye 12 will be disposed in a vertical plane and the hook 18 which is loosely carried by the eye 12 will be suspended from the rear end of the stem, as shown in Figure 1, and permitted to swing freely forwardly and rearwardly and accommodate itself to the position of the body and the speed at which it is drawn through the water. By having the spring coiled about the bill 12' the hook will be prevented from accidentally becoming detached from the eye but when the spring is shifted forwardly and the bill released the hook can be easily removed. In view of the fact that the front end face of the body extends at an incline, the anchoring plate 17 will also be disposed at an incline and drag exerted by movement of the artificial lure through the water will not cause the eye 11 to slip out of a set of notches 14 in which it is engaged. It should also be noted that in order to engage the eye 11 in a set of notches 14 it is necessary to draw the stem forwardly a short distance. This causes the spring 13 to be compressed and expansion of the spring will cause the eye to be firmly held in the selected set of notches. When the eye is engaged in the lowest set of notches, the artificial lure will be drawn through the water close to the surface and when the eye is engaged in the uppermost set of notches the lure will be drawn through the water at quite a depth below the surface. Disposition of the eye in the intermediate set of notches will change the depth at which the lure moves through the water. It will thus be seen that, when a fish line 19 is tied through the eye 11 and the lure passed into the water for trolling purposes, the lure may be caused to move through the water either close to the surface or at a predetermined depth according to the type of fish which it is desired to catch. When it is necessary or desirable to change hooks, the stem is drawn forwardly and then a turn imparted to it so that the eye 11 may pass rearwardly between the flanges 16. The stem is then drawn rearwardly through the body and as it passes through the eye 8 of the hook 7 this hook will be released. A new hook 7 can then be set in place and the stem moved forwardly through the body and through the eye of the hook and, when the eye 11 projects forwardly from between the flanges 16, the stem may be turned to dispose the eye in position for engagement in a selected pair of the notches 14. The eye 12 will be of the open ring type and thus permit changing of the hook 13 when necessary.

In Figures 4 and 5, there has been illustrated two of a set of artificial lures which are of a somewhat different construction from that shown in Figure 1. In this embodiment of the invention, the body 20 is formed with a recess 21, corresponding to the recess 6, and opening into a pocket 22 formed intermediate the length of a passage 23. This passage 23 corresponds to the passage formed longitudinally of the body 1 of the embodiment of the invention illustrated in Figure 1 but is of an even diameter throughout its length, except its intermediate portion which forms the pocket 22 and its rear portion which forms the pocket 24, corresponding to the pocket 3. A stem 25 formed of wire extends through the longitudinally extending passage of the body 20 and is formed with eyes 26 and 27 at its end corresponding to the eyes 11 and 12, a hook 28 being loosely engaged in the eye 27 and a fishing line 29 being tied through the eye 26. A spring 30 yieldably resists forward movement of the stem and holds the eye 26 in the companion notches 31 formed in the outstanding flanges of plates 32 which correspond to the plate 17 and are secured against the diagonally extending front end face of the body. The spring is formed as a continuation of the bill 27' of the eye 27 and the hook 28 must be threaded along the spring into and out of engagement with the eye. Therefore, the hook cannot accidentally become detached from the eye. The plate 32 of one lure of a set will terminate flush with marginal edges of the front end face of the body, as shown in Figure 5, so that the lure will travel through water close to the surface thereof. In order to cause the lure to move through the water at a predetermined depth below the surface, the plate will be extended downwardly beyond the front end of the body, as shown in Figure 4, and the distance to which the plates project from the front end of the body will determine the depth at which the lure moves through the water. A set of the lures constructed as shown in Figures 4 and 5 may consist of any desired number, it being understood that the plates 32 will progressively extend beyond the front end of the body increasing distances. Therefore, by selecting the proper lure of a set, a lure may be brought into use which will travel through the water at the desired depth. The hook 34 corresponds to the hook 7 and is detachably engaged with and suspended from the stem 25 in the same manner in which the hook 7 is suspended from the stem 10.

Having thus described the invention, what is claimed as new is:

1. A fish lure comprising a body formed with a longitudinally extending bore, the under portion of the body being formed with a recess communicating with the bore intermediate the length thereof, a stem extending through the bore, means for detachably engaging said stem and holding the stem in place, a hook suspended from the rear end of the stem back of the body, and a hook under the body having its shank extending upwardly through the recess and engaged with the stem.

2. A fish lure comprising a body formed with a longitudinally extending bore and with a recess intermediate its length communicating with the bore, a stem extending through the bore and formed with front and rear eyes, eye-engaging means at the front end of the body, means for urging the stem rearwardly to normally maintain the front eye in engagement with the eye-engaging means and permit the stem to be drawn forwardly out of engagement with the eye-engaging means and withdrawn rearwardly through the bore, a hook suspended from the rear eye of the stem, and a hook having its shank extending through the intermediate recess and engaged with and suspended from an exposed intermediate portion of the stem.

3. An artificial lure comprising a body formed with a longitudinally extending bore and with a recess intermediate its length communicating with the bore, a stem extending through the bore and formed with a line-engaging member at its front end, a hook having its shank extending through the recess and formed with an eye loosely engaged about the stem, means at the front end of the body for engagement by the line-engaging member of the stem, and means for urging the stem rearwardly and detachably maintaining the line-engaging member in engagement with the said means at the front end of the body.

4. An artificial lure comprising a body formed with a longitudinally extending bore and with a recess in its under side communicating with the bore in spaced relation to the rear end of the body, the forward end of the body being disposed at a forward incline towards its lower end, a plate secured against the front face of the body and formed with a seat, a stem extending longitudinally through the bore of the body and having a line-engaging member at its front end removably engaged in said seat, a hook having its shank extending through the recess into the bore of the body and formed with an eye through which said stem passes to suspend the hook from the stem, and resilient means urging the stem rearwardly and normally maintaining the line-engaging member in the seat.

5. An artificial lure comprising a body formed with a longitudinally extending bore, the body being also formed in its under portion with a recess communicating with the bore in spaced relation to the rear end of the body, the rear portion of the bore back of the recess being enlarged to form a pocket, a stem extending through the bore and having eyes at its front and rear ends, means at the front end of the body for engaging the front eye and anchoring the stem in the body, a hook having its shank extending through the recess into the bore and formed with an eye through which the stem extends to suspend the hook from the stem, a hook suspended from the rear eye back of the body, and a spring in said pocket having its front end bearing against the forward end of the pocket and its rear end engaging the rear eye and urging the stem rearwardly to normally maintain the front eye in engagement with the anchoring means.

6. An artificial lure comprising a body formed with a longitudinally extending bore and having its under portion formed with a recess opening into the bore in spaced relation to the rear end of the bore, the portion of the bore forwardly of the recess gradually increasing in its vertical dimension towards the front end of the body to provide a flaring mouth for the bore, anchoring means at the front end of the body formed with seats disposed one above another, a stem extending longitudinally through the bore and having a member at its front end selectively engaged in a seat to mount the stem in an adjusted position relative to the longitudinal axis of the body, means for urging the stem rearwardly to removably maintain the member at the front end of the stem in a selected seat, and a hook having a shank extending through the recess of the body into the bore and formed with an eye through which the stem extends to suspend the hook from the stem.

7. An artificial lure comprising a body formed with a longitudinally extending bore and with a passage communicating with the bore in spaced relation to the rear end of the body, the front end of the body being cut at a forward incline towards its lower end, a plate secured against the forward end of the body with a portion extending downwardly below the body, a stem extending through the bore and having a line-engaging eye at its front end, the plate being formed with a seat for receiving the eye, a hook having a shank extending through the passage into the bore and suspended from the stem, and a spring for urging the stem rearwardly and maintaining the eye in the seat.

8. A fish lure comprising a body formed with a longitudinally extending bore and with a recess intermediate its length communicating with the bore, a stem extending through the bore and formed from a strand of resilient wire having one end portion bent to form a front eye and its other end portion bent to form an open rear eye and a helical spring extending forwardly from the rear eye and coiled about the stem, eye-engaging means at the front end of the body, said spring abutting the body and serving to urge the stem rearwardly and normally maintain the front eye in engagement with the eye-engaging means and permit the stem to be drawn forwardly out of engagement with the eye-engaging means and then turned and shifted rearwardly through the bore and out of the body, a hook suspended from the rear eye, and a hook having its shank extending through the intermediate recess and suspended from an exposed intermediate portion of the stem.

9. A fish lure comprising a body formed with a longitudinally extending bore, a stem extending through the bore and formed with front and rear eyes, eye-engaging means at the front end of the body, means for urging the stem rearwardly to normally maintain the front eye in engagement with the eye-engaging means and permit the stem to be drawn forwardly out of engagement with the eye-engaging means and withdrawn rearwardly through the bore, and a hook suspended from the rear eye of the stem.

10. An artificial lure comprising a body formed with a longitudinally extending bore, a stem extending through the bore and formed with a line-engaging member at its front end, a hook having its shank engaged with said stem, securing means at the front end of the body for engagement by the line-engaging member of the stem, and means for urging the stem rearwardly and detachably maintaining the line-engaging member in engagement with the said means at the front end of the body.

11. An artificial lure comprising a body formed with a longitudinally extending bore, the forward end of the body being disposed at a forward incline towards its lower end, a plate secured against the front face of the body and formed with a seat, a stem extending longitudinally through the bore of the body and having a line-engaging member at its front end removably engaged in said seat, a hook having its shank engaged with said stem to suspend the hook from the stem, and resilient means urging the stem rearwardly and normally maintaining the line-engaging member in the seat.

12. An artificial lure comprising a body formed with a longitudinally extending bore, the forward portion of the bore gradually increasing in its vertical dimension towards the front end of the body to provide a flaring mouth for the bore, anchoring means at the front end of the body formed with seats disposed one above another, a stem extending longitudinally through the bore and having a member at its front end selectively engaged in a seat to mount the stem in an adjusted position relative to the longitudinal axis of the body, means for urging the stem rearwardly to removably maintain the member at the front end of the stem in a selected seat, and a hook having a shank formed with an eye engaging the stem to suspend the hook from the stem.

13. An artificial lure comprising a body formed with a longitudinally extending bore, the front end of the body being cut at a forward incline towards its lower end, a plate secured against the forward end of the body with a portion extending downwardly below the body, a stem extending through the bore and having a line-engaging eye at its front end, the plate being formed with a seat for receiving the eye, a hook having a shank suspended from the stem, and a spring for urging the stem rearwardly and maintaining the eye in the seat.

14. A fish lure comprising a body formed with a longitudinally extending bore, a stem extending through the bore and formed from a strand of resilient wire having one end portion bent to form a front eye and its other end portion bent to form an open rear eye and a helical spring extending forwardly from the rear eye and coiled about the stem, eye-engaging means at the front end of the body, said spring abutting the body and serving to urge the stem rearwardly and normally maintain the front eye in engagement with the eye-engaging means and permit the stem to be drawn forwardly out of engagement with the eye-engaging means and then turned and shifted rearwardly through the bore and out of the body, and a hook suspended from the rear eye.

VIRGIL PARKINS.